Oct. 18, 1960

D. J. HAMILTON 2,957,090

SAWTOOTH VOLTAGE GENERATOR

Filed March 1, 1957

INVENTOR.

Douglas J. Hamilton,

BY Edwin A. Olson 2,957,090

SAWTOOTH VOLTAGE GENERATOR

Douglas J. Hamilton, Redwood City, Calif., assignor to Hughes Aircraft Company, Culver City, Calif., a corporation of Delaware Filed Mar. 1, 1957, Ser. No. 643,317

13 Claims. (Cl. 307—88.5)

Figures 1, 2:
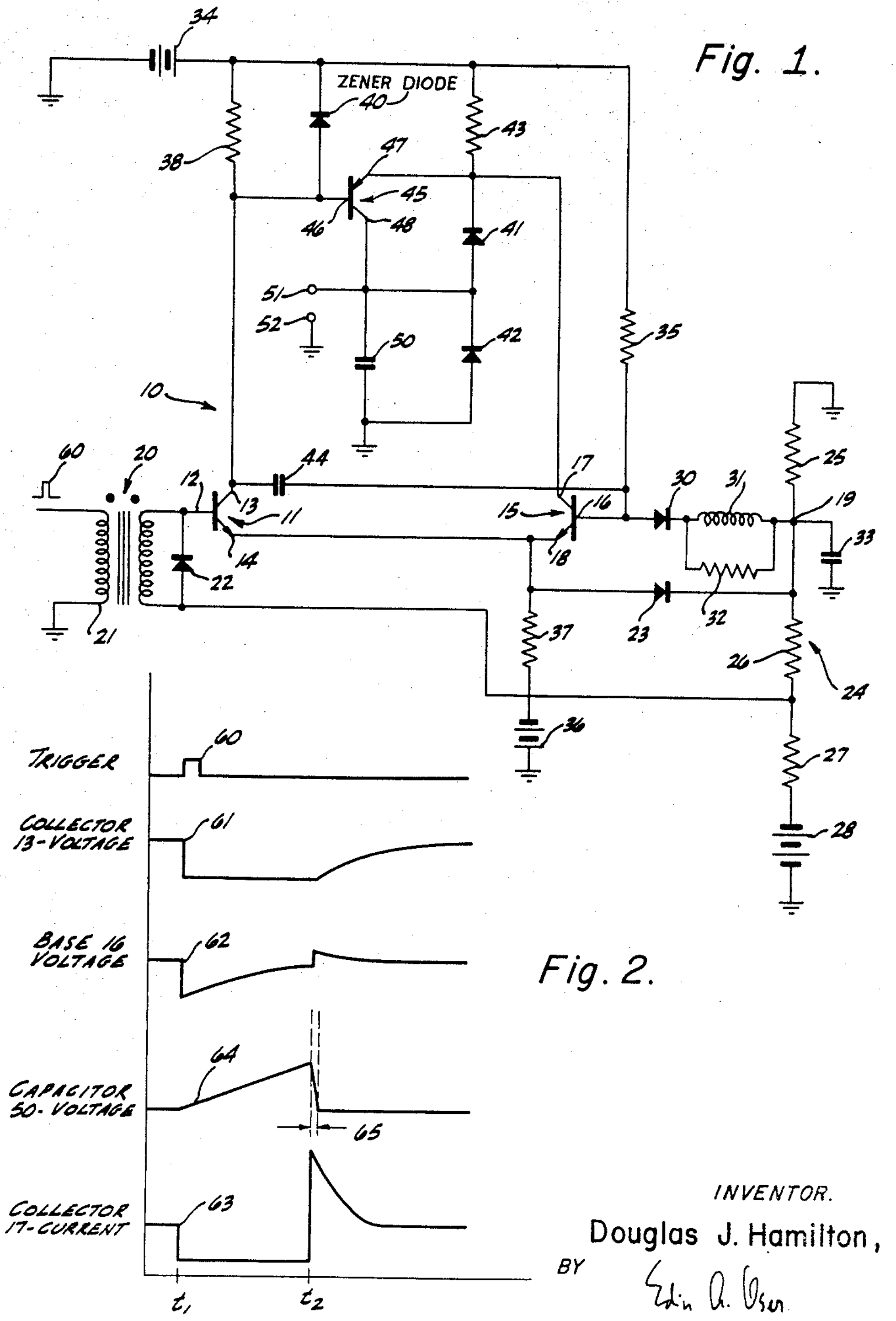

The present invention relates to sawtooth wave generators and more particularly to a sawtooth voltage wave generator.

A sawtooth voltage wave may be said to be a periodic voltage whose amplitude varies substantially linearly with time between two values, with the time required for the voltage to change from one value to the other in one direction being appreciably longer than the time for the change in the opposite direction. A sawtooth voltage can be utilized for many purposes and is often used to produce the horizontal deflection of the electron beam of a cathode ray oscillograph or cathode ray tube.

In the prior art, electronic circuits utilizing vacuum tubes connected in arrangements such as the "bootstrap" circuit have been used to provide a sawtooth voltage. In such circuits the sawtooth wave itself serves as the input signal for a non-inverting power amplifier having a voltage gain of one, with the output signal from the power amplifier being applied to the supply end of the resistor through which the charging current for the capacitor flows. Thus the voltage across the resistor remains substantaılly constant and the sawtooth wave is substantially linear. Blocking oscillators utilizing semiconductor amplifiers have also been proposed to generate sawtooth voltages. In such circuits the sawtooth voltage is provided by a capacitor which is charged by a constant current device and discharged through a substantially short circuit. In general, it may be said that the linearity of the relationship between time and amplitude of a sawtooth voltage derived from a capacitor is mainly dependent upon a constant charging current for the capacitor.

The simplest circuit for providing a constant current for the capacitor is a resistor connected to the capacitor and to a source of high potential. However, if this is used as the current controlling device the charging current will be proportional to the voltage across the resistor and the sawtooth wave will be exponential rather than linear. The degree of linearity for such an arrangement may be controlled by limiting the ratio of the maximum sawtooth amplitude to the initial voltage across the series resistor.

It is therefore evident that one of the problems encountered in developing a linear sawtooth voltage is that of providing a constant charging current for a capacitor. There is in addition a problem in the utilization of the sawtooth voltage in that the discharge time of the capacitor must be taken into consideration for applications which require a fast retrace. The most rapid discharge condition is provided by a short circuit discharge path. In the prior art, however, the switching arrangement utilized to provide a short circuit discharge path for the capacitor has been a limiting factor for the retrace time of the sawtooth voltage.

It is therefore an object of the present invention to provide a linear sawtooth voltage generator.

Another object of the present invention is to provide a sawtooth voltage generator utilizing semiconductor amplifiers.

A further object of the present invention is to provide a sawtooth voltage generator which provides a linear sawtooth voltage and which has a short retrace (or return) time.

In accordance with the present invention the output sawtooth voltage is derived from a capacitor which is charged by the emitter-collector current flow of a transistor. This current-controlling transistor is connected in a common base configuration with the signal output capacitor being essentially the only load in the output circuit of the transistor. Thus the emitter-collector current flow is essentially constant and the time-voltage relationship of the output capacitor is substantially linear.

A monostable circuit is used to control the state of conduction of the current-controlling transistor and also serves to provide a discharge path for the capacitor. The monostable circuit includes second and third transistors so connected in a network that the quasi-stable time of the circuit does not vary with temperature.

After the first current-controlling transistor is rendered conductive by the monostable circuit, a constant current flows into the capacitor and provides the linear time-voltage relationship. When the current-controlling transistor is rendered non-conductive, the capacitor is then discharged through a diode and one of the transistors of the monostable circuit connected in a manner which provides a much larger current than the charging current. The discharge-time is thus shorter than the charge-time.

The novel features that are considered characteristic of this invention are set forth with particularity in the appended claims. The invention itself, however, both as to its organization and method of operation as well as additional objects and advantages thereof, will be best understood from the following description when read in connection with the accompanying drawing and in which, Fig. 1 is a circuit diagram of a preferred embodiment of the sawtooth voltage generator of the present invention; and Fig. 2 is a graphical representation of current and voltage versus time illustrating the operation of the sawtooth voltage generator of Fig. 1.

Referring now to the drawing and in particular to Fig. 1 there is shown a monostable circuit 10 which includes a first transistor 11 having a base electrode 12, a collector electrode 13, an emitter electrode 14, and a second transistor 15 having a base electrode 16, a collector electrode 17 and an emitter electrode 18. For purposes of illustration the transistors 11 and 15 are shown as NPN junction transistors by the accepted symbol. However, it is to be expressly understood that this particular type of transistor is shown for purposes of illustration only and that transistors 11 and 15 could be replaced by junction transistors of opposite conductivity type if the proper voltage and diode polarity changes were made.

Coupled to the base 12 of the first transistor 11 is a signal input circuit 20 which may include a transformer 21 having a diode 22 connected across the secondary thereof in a manner which is well known in the art. The first transistor 11 is biased to be in a normally nonconducting condition and the second transistor 15 is biased to be in a normally conducting condition.

To this end the base 12 of the first transistor 11 is coupled to a first voltage divider network 24. The voltage divider network 24 includes the dropping resistors 25, 26, and 27 connected in series arrangement between ground and the negative terminal of a first source of direct current (D.C.) potential such as the battery 28 which has its positive terminal connected to ground. The emitter 14 of the first transistor 11 is coupled to the negative terminal of a second source of D.C. potential such as the battery 36 through a dropping resistor 37. Thus under static conditions the base of the first transistor 11 is more negative than the emitter 14 and the first transistor is rendered nonconductive.

The base 16 of the second transistor 15 is clamped to the potential of a first point 19 of the voltage divider network 24 by a first clamping diode 30, and the emitter 18 is coupled to the negative terminal of the third source of D.C. potential 36 through the dropping resistor 37. Thus under static conditions the second transistor 15 is biased normally conducting. It is seen that the emitter current of the second transistor 15 is determined by the dropping resistor 37.

Because of the voltage drop between the base and the emitter of transistor 15 the emitter 18 will be slightly negative with respect to the base 16. Thus a second clamping diode 23 which is coupled between the emitter 18 and the first point 19 of the voltage divider network 24 (to which the base 16 is clamped through the clamping diode 30) will be biased in a state of low conductance. To this end a silicon diode might be advantageously used for diode 23. As will be explained later diode 23 is forward biased only during the retrace mode of the circuit.

An inductor 31 is coupled between the first clamping diode 30 and the voltage divider network 24 and serves to present a high impedance to the trigger pulse and to transients in general. A resistor 32 is connected in parallel with the inductor 31 to prevent oscillations, and to this end the resistance of the resistor 32 may advantageously be made equal to the critical damping resistance of the inductor 31. A capacitor 33 is connected between the first point 19 of the voltage divider network 24 and signal ground to provide a low impedance path to ground for transients.

The base 16 of the second transistor is also coupled to a third source of D.C. potential, such as the battery 34, having its negative terminal connected to ground, through an impedance element such as the resistor 35. Current flow from the third source of potential 34 through the resistor 35 and the first clamping diode 30 is made relatively large in comparison to the current which flows from the collector to the base under static conditions ($Ic_0$) of the second transistor 15. This insures that the quasi-stable time of the monostable circuit will not vary with temperature.

From the above described base-emitter bias conditions for the first and second transistors 11 and 15 it is seen that the second transistor 15 is biased in a conductive condition and the first transistor 11 is biased in a nonconductive condition.

To complete the collector-emitter circuit for the first transistor 11 the collector 13 is coupled to the third battery 34 through an impedance element such as the resistor 38. To prevent the collector 13 from changing potential by more than a predetermined value a Zener diode 40 is connected in parallel with the resistor 38. Thus when the voltage across the Zener diode 40 becomes equal to the breakdown voltage of the diode, the characteristic wherein the voltage remains substantially constant over an appreciable range of current values, serves to prevent any further voltage change of the collector 13.

To complete the emitter-collector circuit of the second transistor 15 the collector 17 is clamped to ground by a pair of unidirectional current conductive devices such as the diodes 41 and 42 connected in series. The reason for having two diodes in series will be more fully explained in conjunction with the operation of the circuit. The collector 17 is also coupled to the positive terminal of the second battery 34 through an impedance element such as the resistor 43.

A cross-coupling capacitor 44 is connected between the collector 13 of the first transistor 11 and the base 16 of the second transistor 15 to impress voltage changes appearing at the collector 13 to the base 16 of the second transistor.

A third transistor 45, shown for purposes of illustration as a PNP junction transistor, having a base electrode 46 connected to the collector electrode 13 of the first transistor, an emitter electrode 47 connected to the collector 17 of the second transistor, and a collector electrode 48 coupled to signal ground through a signal output capacitor 50, serves as the current-controlling device for the charging current of the signal output capacitor 50. A pair of signal output terminals 51 and 52, one of which is connected to the ungrounded side of the output capacitor 50 and the other of which is connected to the grounded side of the output capacitor 50, serve as points from which the output sawtooth voltage wave can be derived. The diode 42 in addition to being connected in series with the diode 41 is connected in parallel with the output sawtooth voltage as referred to ground and thus at no time be more negative than ground.

Since the base 46 is coupled to the positive terminal of the second battery 34 through the resistor 38 (through which no current is normally flowing) and the emitter 47 is coupled to the same battery 34 through the resistor 43 (through which current is normally flowing) the third transistor 45 is normally nonconductive. That is, the emitter 47 is normally negative with respect to the base 46. Since the base 46 is at the potential of the positive terminal of the battery 34 when the second transistor 15 is nonconductive, and is clamped to a certain potential by the Zener diode when the second transistor is conductive, the base potential is in essence the controlling voltage to which the emitter potential is referred. Thus the third transistor is essentially connected in a common base arrangement.

To explain the operation of the circuit of Fig. 1 the voltage and current waveforms of Fig. 2 will be referred to. When a positive trigger pulse 60 is applied to the base 12 of the first transistor at time $t_1$, the first transistor 11 is rendered conductive and the potential 61 of collector 13 suddenly drops, that is, becomes less positive than it formerly was by virtue of being maintained at the potential of the positive terminal of the third battery 34. This change in potential is applied to the base 16 of the second transistor 15 by the cross-coupling capacitor 44 and the base potential 62 of the second transistor suddenly becomes more negative. Thus at the time $t_1$ when the trigger pulse 60 has been applied to the base of the first transistor, the first transistor 11 is rendered conductive and the second transistor 15 is rendered nonconductive. The collector current 63 of the second transistor is therefore reduced to zero.

The collector-emitter current of the first transistor which is provided by the battery 34 through the resistor 38 causes a potential drop across the resistor 38 making the base 46 of the third transistor more negative. The amount of this potential drop is limited by the Zener diode 40. Thus at time $t_1$ the third transistor 45 is rendered conductive and emitter-collector current flows through the transistor 45 and into the output capacitor 50. This current will be substantially constant since changes in the emitter-base potential are very small compared with the voltage maintained across resistor 38 by diode 40 and the collector current of transistor 11. Thus the voltage applied across resistor 43 is essentially constant, and the current through resistor 43, which is the emitter current of transistor 45, is constant. The voltage 64 across the output capacitor 50 thus begins to rise in a manner which is substantially linear with respect to time.

The quasi-stable time of the monostable circuit 10 during which the output capacitor 50 is being charged is determined by the cross-coupling capacitor 44 and the current through the dropping resistor 35. When the base voltage 62 of the second transistor 15 reaches the emitter voltage at a time $t_2$ the second transistor of the monostable circuit is again rendered conductive and the first transistor is rendered nonconductive. The third current controlling transistor 45 is also rendered nonconductive, since the current flow through the resistor 43 makes the emitter 47 negative with respect to the base 46.

When the transistor 11 is rendered nonconductive all of the current which was flowing through resistor 38 is transferred by the cross-coupling capacitor 44 to the base circuit of the second transistor 15. Very little of this current passes through the clamping diode 30 because of the high impedance to transients provided by the inductor 31.

When the current begins to flow into the base 16 of the second transistor 15 a large current begins to flow in the emitter circuit. As this large emitter current begins to flow the emitter potential tends to rise but is prevented from rising by the clamping diode 23. That is, as soon as the potential of the emitter 18 becomes sufficiently positive to render the diode 23 forward biased the emitter current will no longer be limited by the dropping resistor 37. Thus the transistor 15 is operating in the common emitter mode and the current in the collector, which is the discharge current for the signal output capacitor 50, will be large.

As the cross-coupling capacitor 44 charges, the base 16 returns to its original value. When the base 16 has reached its initial value the circuit has completed one cycle and is in its original condition. The diode 42 which is connected in parallel with the signal output capacitor 50 insures that the capacitor 50 will discharge only to ground potential and the output wave form will thus be referenced to ground.

While it is to be expressly understood that the circuit specifications for the sawtooth voltage generator of the present invention may vary according to the design for any particular application, the following specifications for the circuit of Fig. 1 are included by way of example only:

| | |
|---|---|
| Transistors 11 and 15 | General Electric type 2N94A. |
| Transistor 45 | General Electric type 2N123. |
| Resistor 25 | 300 ohms. |
| Resistor 26 | 100 ohms. |
| Resistor 27 | 750 ohms. |
| Resistor 35 | 10,000 ohms. |
| Resistor 37 | 1,000 ohms. |
| Resistor 38 | 1,500 ohms. |
| Resistor 43 | 2,000 ohms. |
| Diodes 23, 30, 41 and 42 | General Electric type 1N100. |
| Capacitor 44 | 0.01 microfarad. |
| Capacitor 33 | 1 microfarad. |
| Capacitor 50 | 0.01 microfarad. |
| Inductor 31 | 10 millihenry. |
| Voltage source 28 | −10 volts. |
| Voltage source 36 | −10 volts. |
| Voltage source 34 | +10 volts. |

The sawtooth voltage generator which was constructed in accordance with the values of the various circuit elements as set forth above provided a sweep time of 25 microseconds and a retrace time of considerably less than one microsecond (the ratio of sweep time to retrace time was in the vicinity of approximately 40 to one). The departure from linearity for a four volt maximum amplitude sawtooth was considerably less than one percent.

There has thus been disclosed a sawtooth voltage generator which utilizes a transistor to provide a substantially constant current to an output capacitor when the transistor is conductive. A monostable circuit is utilized to control the state of conduction of the current controlling transistor and in addition, in conjunction with a diode switch, serves to provide a substantially short circuit discharge path for the capacitor and thus makes possible a very short retrace time.

What is claimed is:

1. A sawtooth voltage wave generator comprising, a first transistor having base, collector, and emitter electrodes, means rendering said first transistor normally nonconductive, a capacitor connected in series with the emitter-collector circuit of said first transistor for providing an output sawtooth voltage wave, a monostable circuit coupled to said first transistor and including second and third transistors for controlling said first transistor and for discharging said capacitor, bias means coupled to said monostable circuit rendering said second transistor normally nonconductive and rendering said third transistor normally conductive, means interconnecting said third transistor and said capacitor for providing a discharge path for said capacitor which includes said third transistor, signal forming means for periodically rendering said second transistor conductive and storage means connected between said second and said third transistor to render said third transistor nonconductive, said first transistor being rendered conductive in response to said second transistor being conductive, whereby said capacitor is charged through said first transistor in response to said first transistor being rendered conductive and is discharged through said third transistor in response to said third transistor being conductive.

2. A sawtooth voltage wave generator comprising, a first transistor having emitter, base, and collector electrodes, a capacitor for developing an output sawtooth voltage wave, said capacitor being serially connected with the emitter-collector circuit of said first transistor for charging said capacitor with a substantially constant current in response to said first transistor becoming conductive, a second and a third transistor for forming a monostable circuit coupled to said first transistor for controlling said first transistor and for discharging said capacitor, said second and third transistors each having emitter, collector, and base electrodes, a unilateral current conductive device connected in series between said capacitor and the emitter-collector circuit of said third transistor, said unilateral current device being biased into conduction by said monostable circuit, biasing means rendering said first and second transistors normally nonconductive and said third transistor normally conductive, means coupled to said monostable circuit for periodically rendering said third transistor nonconductive and said second transistor conductive, whereby said first transistor is rendered conductive and said capacitor is charged, said unilateral current conductive device and the emitter-collector circuit of said third transistor providing a low-impedance path for discharging said capacitor in response to said third transistor being conductive, whereby the discharge period of said capacitor is short compared to the charge period thereof.

3. A sawtooth voltage wave generator which comprises, a first transistor having base, collector, and emitter electrodes, a capacitor connected in series with the emitter-collector circuit of said first transistor for providing an output sawtooth voltage wave, a second and a third transistor forming a monostable circuit for controlling said first transistor and for discharging said capacitor, bias means coupled to said transistors and adapted to maintain said first and second transistors normally nonconductive and said third transistor normally conductive, means for applying a signal to said monostable circuit to cause the states of conduction of said second and third transistors to be interchanged for a predetermined time interval, said monostable circuit being coupled to said first transistor to render said first transistor conductive for said predetermined time interval, whereby a substantially constant current flows into said capacitor during conduction of said first transistor, and a diode connected between said capacitor and said third transistor controlled by said monostable circuit for providing a low-impedance discharge path for said capacitor including said third transistor for discharging said capacitor when said third transistor is conductive.

4. A sawtooth voltage wave generator comprising, a first transistor having base, collector, and emitter electrodes, a capacitor connected in series with the emitter-collector circuit of said first transistor for providing an output sawtooth voltage wave, a monostable circuit including second and third transistors, means coupled to said monostable circuit rendering said second transistor normally nonconductive and said third transistor normally conductive, means coupled to said monostable circuit for periodically rendering said second transistor conductive and said third transistor nonconductive for a predetermined quasi-stable period, means interconnecting said second transistor and said first transistor to render said first transistor conductive during the quasi-stable period of said monostable circuit, a first clamping diode connected in parallel with said capacitor, bias means connected serially with said capacitor and said third transistor, and a second diode connected between said first diode and said third transistor for providing a substantially short circuit discharge path for said capacitor including said third transistor for discharging said capacitor when said third transistor is conductive, whereby said first diode clamps said capacitor at a voltage which is above the voltage of said third transistor provided by said bias means.

5. A sawtooth voltage wave generator which comprises, a first transistor having base, collector, and emitter electrode, a capacitor connected in series with the emitter-collector circuit of said first transistor for providing an output sawtooth voltage wave, a monostable circuit including second and third transistors, said second and third transistors each having base, collector, and emitter electrodes, means coupled to said monostable circuit for rendering said second transistor normally nonconductive and third transistor normally conductive, means for applying a trigger pulse to said monostable circuit whereby said third transistor is rendered nonconductive and said second transistor is rendered conductive for a predetermined time interval, means interconnecting said first transistor and said monostable circuit for rendering said first transistor conductive when said third transistor is nonconductive, a first diode connected in parallel with said capacitor, a second diode interconnecting said first diode and the emitter-collector circuit of said third transistor, and a voltage source connected serially with said capacitor and the emitter-collector circuit of said transistor, whereby a substantially short circuit discharge path for said capacitor is provided when said third transistor is conductive, said discharge path including said second diode and the emitter-collector circuit of said third transistor, and whereby the voltage of said capacitor is clamped by said first diode so that the voltage across said capacitor varies at a rapid linear rate.

6. A sawtooth voltage wave generator comprising, a first PNP junction transistor having base, collector, and emitter electrodes, a capacitor serially connected with the emitter-collector circuit of said first transistor for providing an output sawtooth voltage wave, a monostable circuit having a predetermined quasi-stable time interval for controlling said first transistor and for controlling the charge of said capacitor and including second and third NPN junction transistors each having base, collector, and emitter electrodes, bias means coupled to said transistors and adapted to maintain said first and second transistors normally nonconductive and said third transistor normally conductive, a signal input circuit coupled to said monostable circuit and adapted to receive a trigger pulse for rendering said second transistor conductive and said third transistor nonconductive for said predetermined quasi-stable time interval, means interconnecting said first transistor with said monostable circuit for rendering said first transistor conductive during said quasi-stable time interval whereby said capacitor is provided with a substantially constant current during said quasi-stable time interval, a first diode connected between said capacitor and the collector-emitter circuit of said third transistor and controlled by current passing through said monostable circuit for providing a substantially short circuit discharge path for said capacitor through said third transistor when said third transistor is rendered conductive, and a second diode connected to said capacitor to limit the discharge of said capacitor.

7. A sawtooth voltage wave generator comprising, a monostable circuit including first and second NPN junction transistors, each having base, collector, and emitter electrodes, bias means coupled to each of said electrodes for rendering said first transistor normally nonconductive and said second transistor normally conductive, a third PNP transistor having base, collector, and emitter electrodes, means interconnecting said bias means with the emitter and base electrodes of said third transistor for rendering said third transistor normally nonconductive, means for applying a pulse to said monostable circuit for interchanging the states of conduction of said first and second transistors for a predetermined time interval, storage means connected between said first and said second transistors for maintaining said second transistor nonconducting for said predetermined time interval, means interconnecting said third transistor with said monostable circuit for rendering said third transistor conductive throughout said predetermined time interval in response to said second transistor becoming nonconductive, a capacitor connected in series with the emitter-collector circuit of said third transistor for providing an output sawtooth voltage wave when said third transistor is conductive, a first diode interconnecting said capacitor and the collector electrode of said second transistor for providing a discharge path for said capacitor when said second transistor is conductive and which includes the collector-emitter circuit of said second transistor, and a second diode connected across said discharge path of said capacitor to limit the discharge of said capacitor, whereby said capacitor is discharged through a substantially short-circuit path.

8. A sawtooth voltage wave generator comprising, first and second NPN junction transistors, each having a base, collector, and emitter, first bias means coupled to each of said collectors for providing current thereto, a first voltage divider network coupled to each of said bases and to each of said emitters and adapted to render said first transistor normally nonconductive and said second transistor normally conductive, means interconnecting said first bias means and the base of said second transistor, a signal input circuit coupled to the base of said first transistor for applying control signals thereto to render said first transistor periodically conductive, a first cross-coupling capacitor connected between the collector of said first transistor and the base of said second transistor for conveying voltage changes at the collector of said first transistor to the base of said second transistor, whereby said second transistor is rendered nonconductive for a predetermined time interval in response to said first transistor being rendered conductive, a third PNP junction transistor having a base, collector, and emitter, means directly interconnecting the base of said third transistor with the collector of said first transistor and directly interconnecting the emitter of said third transistor with the collector of said second transistor, whereby said third transistor is rendered nonconductive when said second transistor is conductive, a second capacitor serially connected between the collector of said third transistor and said first bias means, whereby said second capacitor is charged at a substantially linear rate when said third transistor is rendered conductive, a first diode connected in parallel with said second capacitor for clamping the voltage across said capacitor, and a second diode serially connected between said second capacitor and the collector-emitter circuit of said second transistor, whereby a substantially short circuit discharge path is provided for said second capacitor through said second diode and the collector-emitter circuit of said second transistor when said second transistor is conductive.

9. A sawtooth voltage wave generator as defined in claim 8 and including a third diode and an inductor serially connected between said first voltage divider network and the base of said second transistor.

10. A sawtooth voltage wave generator as defined in claim 9 and including voltage clamping means connected between the emitter of said second transistor and said first voltage divider network.

11. A sawtooth voltage wave generator comprising, a monostable circuit including first and second NPN junction transistors, each having base, collector, and emitter electrodes, bias means coupled to each of said electrodes for rendering said first transistor normally nonconductive and said second transistor normally conductive, a third PNP transistor having base, collector, and emitter electrodes, means interconnecting said bias means with the emitter and base electrodes of said third transistor for rendering said third transistor normally nonconductive, means for applying a pulse to said monostable circuit for interchanging the states of conduction of said first and second transistors for a predetermined time interval, storage means connected between said first and said second transistors for maintaining said second transistor nonconducting for said predetermined time interval, means interconnecting said third transistor with said monostable circuit for rendering said third transistor conductive throughout said predetermined time interval in response to said second transistor becoming nonconductive, a capacitor connected in series with the emitter-collector circuit of said third transistor for providing an output sawtooth voltage wave when said third transistor is conductive, a first diode interconnecting said capacitor and the collector electrode of said second transistor for providing a discharge path for said capacitor when said second transistor is conductive and which includes the collector-emitter circuit of said second transistor, a second diode connected across said discharge path of said capacitor to limit the discharge of said capacitor, and an inductor connected between the base electrode of said second transistor and said bias means, whereby said capacitor is discharged through a substantially short-circuit path.

12. A sawtooth voltage wave generator comprising, a monostable circuit including first and second NPN junction transistors, each having base, collector, and emitter electrodes, bias means coupled to each of said electrodes for rendering said first transistor normally nonconductive and said second transistor normally conductive, a third PNP transistor having base, collector, and emitter electrodes, means interconnecting said bias means with the emitter and base electrodes of said third transistor for rendering said third transistor normally nonconductive, means for applying a pulse to said monostable circuit for interchanging the states of conduction of said first and second transistors for a predetermined time interval, means interconnecting said third transistor with said monostable circuit for rendering said third transistor conductive throughout said predetermined time interval in response to said second transistor becoming nonconductive, a capacitor connected in series with the emitter-collector circuit of said third transistor for providing an output sawtooth voltage wave when said third transistor is conductive, a first diode interconnecting said capacitor and the collector electrode of said second transistor for providing a discharge path for said capacitor when said second transistor is conductive and which includes the collector-emitter circuit of said second transistor, an inductor connected between the base electrode of said second transistor and said bias means, and a second diode connected in parallel with said capacitor for clamping the voltage across said capacitor, whereby said capacitor is discharged through a substantially short-circuit path.

13. A sawtooth voltage wave generator comprising, a monostable circuit including first and second NPN junction transistors, each having base, collector, and emitter electrodes, bias means coupled to each of said electrodes for rendering said first transistor normally nonconductive and said second transistor normally conductive, a third PNP transistor having base, collector, and emitter electrodes, means interconnecting said bias means with the emitter and base electrodes of said third transistor for rendering said third transistor normally nonconductive, means for applying a pulse to said monostable circuit for interchanging the states of conduction of said first and second transistors for a predetermined time interval, means interconnecting said third transistor with said monostable circuit for rendering said third transistor conductive throughout said predetermined time interval in response to said second transistor becoming nonconductive, a capacitor connected in series with the emitter-collector circuit of said third transistor for providing an output sawtooth voltage wave when said third transistor is conductive, a first diode interconnecting said capacitor and the collector electrode of said second transistor for providing a discharge path for said capacitor when said second transistor is conductive and which includes the collector-emitter circuit of said second transistor, a second diode connected in parallel with said capacitor for clamping the voltage across said capacitor, and a Zener diode connected between the collector electrode of said first transistor and said bias means for clamping the collector potential at a substantially fixed level when said first transistor is rendered conductive, whereby said capacitor is discharged through a substantially short-circuit path.

References Cited in the file of this patent

UNITED STATES PATENTS

| | | |
|---|---|---|
| 2,522,957 | Miller | Sept. 19, 1950 |
| 2,735,011 | Dickinson | Feb. 14, 1956 |
| 2,827,568 | Altschul | Mar. 18, 1958 |